(12) United States Patent
Stutz

(10) Patent No.: US 11,578,920 B2
(45) Date of Patent: Feb. 14, 2023

(54) ARRANGEMENT FOR SUPPORTING A ROTARY DRUM

(71) Applicant: HOLCIM TECHNOLOGY LTD, Zug (CH)

(72) Inventor: Thomas Stutz, Holderbank (CH)

(73) Assignee: HOLCIM TECHNOLOGY LTD, Zug (CH)

(\*) Notice: Subject to any disclaimer, the term of this patent is extended or adjusted under 35 U.S.C. 154(b) by 142 days.

(21) Appl. No.: 17/204,623

(22) Filed: Mar. 17, 2021

(65) Prior Publication Data

US 2021/0199380 A1 Jul. 1, 2021

Related U.S. Application Data

(62) Division of application No. 16/076,949, filed as application No. PCT/IB2017/000102 on Feb. 10, 2017, now abandoned.

(30) Foreign Application Priority Data

Feb. 12, 2016 (AT) .................................. A 72/2016

(51) Int. Cl.
*F27B 7/22* (2006.01)
*F16C 13/04* (2006.01)
(Continued)

(52) U.S. Cl.
CPC ............... *F27B 7/22* (2013.01); *F16C 13/04* (2013.01); *F16C 19/507* (2013.01);
(Continued)

(58) Field of Classification Search
CPC .. F27B 7/22; F27B 7/2206; F27B 7/42; F16C 13/04; F16C 19/507
(Continued)

(56) References Cited

U.S. PATENT DOCUMENTS

| 279,179 A | 6/1883 | Pfeifer |
|---|---|---|
| 2,551,774 A | 5/1951 | Traylor |

(Continued)

FOREIGN PATENT DOCUMENTS

| DE | 17 75 439 A1 | 10/1971 |
|---|---|---|
| EP | 2 724 103 A1 | 4/2014 |
| WO | WO 2013/001334 A1 | 1/2013 |

OTHER PUBLICATIONS

International Search Report as issued in International Patent Application No. PCT/IB2017/000102, dated Mar. 30, 2017.

*Primary Examiner* — Terrell L McKinnon
*Assistant Examiner* — Michael McDuffie
(74) *Attorney, Agent, or Firm* — Pillsbury Winthrop Shaw Pittman LLP

(57) ABSTRACT

An arrangement for supporting a rotary drum, the rotary drum having at least three riding rings distributedly arranged along the axial direction of the rotary drum, the arrangement including a pair of relatively spaced rollers for supporting a riding ring, at least one bearing for each roller, a support for each bearing mounted for movement of the roller toward and away from the shell of the rotary drum and a spring system exerting a spring force acting on the support to counteract the weight of the rotary drum resting on the rollers, wherein the spring system includes a pressure vessel charged with a compressed gas that exerts the spring force and the rotary drum includes at least three riding rings and only at least one middle ring arranged between two outer rings is supported by a pair of relatively spaced rollers that are equipped with the spring system.

15 Claims, 6 Drawing Sheets

(51) Int. Cl.
*F27B 7/42* (2006.01)
*F16C 19/50* (2006.01)
*F27B 7/26* (2006.01)

(52) U.S. Cl.
CPC .............. *F27B 7/2206* (2013.01); *F27B 7/42* (2013.01); *F27B 2007/228* (2013.01); *F27B 2007/2253* (2013.01); *F27B 2007/261* (2013.01)

(58) Field of Classification Search
USPC ..... 248/677, 676, 678, 49, 80, 188.1, 188.2, 248/349.1; 432/103, 104
See application file for complete search history.

(56) References Cited

U.S. PATENT DOCUMENTS

| | | | |
|---|---|---|---|
| 3,185,459 A | 5/1965 | Caubet | |
| 3,436,062 A | 4/1969 | Raevsky | |
| 3,517,915 A | 6/1970 | Deynat | |
| 3,693,337 A | 9/1972 | Fevre | |
| 3,786,379 A | 1/1974 | Lutchansky | |
| 3,818,777 A | 6/1974 | Pere | |
| 4,171,949 A | 10/1979 | Endersen et al. | |
| 4,344,596 A | 8/1982 | Hjaeresen | |
| 4,696,116 A * | 9/1987 | Livingston | F26B 11/022 432/103 |
| 4,728,203 A | 3/1988 | Okamoto | |
| 4,765,255 A | 8/1988 | Chiarva | |
| 4,776,788 A | 10/1988 | Przewalski | |
| 4,784,362 A | 11/1988 | Wang | |
| 5,028,019 A | 7/1991 | Hardtke | |
| 5,580,242 A | 12/1996 | Becker | |
| 6,186,778 B1 | 2/2001 | Bonin | |
| 6,447,289 B1 | 9/2002 | Boyne | |
| 7,472,877 B2 | 1/2009 | Hawkins | |
| 8,646,731 B2 | 2/2014 | Burles | |
| 9,482,384 B2 | 11/2016 | Stuble | |
| 9,709,332 B1 * | 7/2017 | Gebhart | F16C 13/04 |
| 9,719,724 B2 * | 8/2017 | Stutz | F27D 19/00 |
| 10,254,045 B2 * | 4/2019 | Stutz | F27D 21/04 |
| 2003/0048968 A1 | 3/2003 | Korting | |
| 2007/0266798 A1 | 11/2007 | Gebhart | |
| 2014/0134558 A1 | 5/2014 | Stutz | |
| 2014/0339375 A1 | 11/2014 | Birch | |
| 2021/0102644 A1 * | 4/2021 | Guerra | E21B 7/28 |

* cited by examiner

ARRANGEMENT FOR SUPPORTING A ROTARY DRUM

CROSS-REFERENCE TO RELATED APPLICATIONS

This application is a divisional of U.S. application Ser. No. 16/076,949, filed Aug. 9, 2018, which is a U.S. National Stage of International Application Serial No. PCT/IB2017/000102, filed Feb. 10, 2017, which in turn claims priority to Austrian Application No. A 72/2016, filed Feb. 12, 2016. The contents of all of these applications are incorporated herein by reference in their entirety.

BACKGROUND OF THE INVENTION

Technical Field

The invention refers to an arrangement for supporting a rotary drum, in particular a rotary kiln of a cement manufacturing installation, said rotary drum having at least three riding rings distributedly arranged along the axial direction of the rotary drum, the arrangement comprising a pair of relatively spaced rollers for supporting a riding ring, at least one bearing for each roller, a support for each bearing mounted for movement of the roller toward and away from the shell of the rotary drum and spring means exerting a spring force acting on the support so as to counteract the weight of the rotary drum resting on the rollers.

Description of Related Art

An arrangement of this kind is disclosed in U.S. Pat. Nos. 2,551,774 and 4,171,949.

As mentioned in U.S. Pat. No. 4,171,949 rotary drums, such as rotary dryers, tube mills, drum sieves and particularly rotary kilns are commonly supported by roller supports. The rotary drums usually are provided with two or more ring-like members known as track rings or riding rings, which are secured to the outer circumference of the drum body. Each riding ring rests upon a pair of the rollers. These rollers are each rotatably supported in at least one bearing, which is mounted on solid foundations.

Ideally, the outer surface of the riding ring bears correctly against the outer surface of the rollers along a common generatrix. The drum with its riding rings then is correctly aligned with the rollers in a vertical plane and along the axis of the drum. However, under certain operation conditions cranks may be observed. Cranks are straightness deviations of the drum that can be so strong, that the riding ring of the drum lifts from the support rollers once per revolution. Further, cranks lead to a cyclic overload of the support rollers and the riding ring. The cranks are typically caused by uneven temperature or overheating of the drum shell. Uneven temperatures in the drum shell can occur regularly, depending on the uniformity of kiln operation.

Under unfavourable conditions, the load on the rollers may increase to a multiple of the normal load for which the rollers are designed. Such loads result in localized contact pressures between the riding ring and the rollers, which cause severe damage to the riding rings and the rollers. Because of the unequal distribution of the load on the rollers, a total breakdown or collapse of the rollers may result.

To compensate for such cyclic overloads, it is possible to provide the drums with rollers that are designed to take these conditions into account. For example, the rollers may be supported pivotally in bearings to compensate for axial misalignment, and the bearings may be resiliently supported to compensate for misalignment in the vertical and/or horizontal plane. In particular, a housing for each bearing of the rollers may be supported directly or indirectly by a hydraulic cylinder or a flexible cushion. More particularly, the housing may be supported on a rocker pivoting about an axis substantially parallel to the axis of the drum. As a result of the prior art arrangements, the rollers tend to follow the riding ring track on the drum, but inadvantageously, localized pressure still exists. This is especially true with relatively large compensating movements of the rollers. The reason is that the forces exerted by the spring means acting on the support of the roller bearings increase with increasing compensating movement path, because of linear or progressive spring characteristics.

A further disadvantage of prior art supporting arrangements is that the spring means, such as hydraulic cylinders, are difficult to arrange in the region below the rollers because of the limited space available. This problem is particularly relevant when spring means are to be retrofitted in existing installations.

SUMMARY OF THE INVENTION

Therefore, it is an object of the invention to provide an improved support for a rotary drum that allows further reducing or even completely preventing cyclic overloads of the supporting rollers. Further, it is an object of the invention to reduce the vertical space needed for arranging the spring means below the rollers.

To solve this object the invention in an arrangement of the initially defined kind essentially consists in that the spring means comprise a pressure vessel charged with a compressed gas that exerts the spring force. Thus, the spring force counteracting the weight of the rotary drum resting on the rollers is not provided exclusively by a pressurized liquid fluid, such as a hydraulic oil of a cylinder-piston unit, but comprises the effects of a compressed gas cushion. In this way, an optimization of the spring characteristics may be achieved, resulting in that the spring force does not considerably increase as a function of the displacement path of the rollers. Further, an additional advantage of the embodiment according to the invention is that the pressure of the compressed gas contained in the pressure vessel can easily be adjusted to the optimal level, in which the rollers are taking up the nominal design load of the rotary drum, without substantially changing the spring characteristics of the spring means.

Further, the pressure vessel must not necessarily be arranged in the region below the rollers, but may be arranged beside the supporting structure so that retrofitting of existing installations is easily feasible without substantially increasing the vertical space needed below the rollers.

In order to minimize frictional losses of the compensation mechanism, a preferred embodiment of the invention provides that the support is mounted for pivotal movement about a pivot axis like a hinge. The spring means are preferably arranged to act on the support at a distance from the pivot axis of the support that is larger than the distance of the roller from the pivot axis. In this way, a larger lever arm is effective for the spring means than for the supporting rollers so that the spring means may be operated at a lower pressure level in the pressure vessel.

Pivotal mounting of the support has considerable advantages over a sliding mounting of the support in a lateral direction. A sliding arrangement of the support results in higher frictional forces and the forth-and-back motion of the support does not behave in direct proportionality to the forces acting on the rollers, but a hysteresis is to be observed. The combination of a pivotal mounting of the support with an air cushion as the spring means results that the rollers follow the riding ring track in a very precise, direct and frictionless manner.

In order to reduce the vertical space needed for installing the spring means below the rollers, the fluid system comprising the compressed medium is preferably divided into two separate fluid volumes, one fluid volume being arranged below the support of the roller bearings and the other fluid volume being arranged in the pressure vessel. In this way, only part of the total compressed fluid volume is arranged below the support of the roller bearings so that account is taken of the limited vertical space there. In this connection, a preferred embodiment is devised such that the spring means comprise a fluid chamber designed so as to change its volume upon movement of the roller under the weight of the rotary drum resting on the rollers, wherein said chamber is fluidly connected to the pressure vessel by means of a fluid line.

A pressure vessel may be used for exerting a spring force on only one bearing support or on two or more bearing supports. In case of two or more roller bearings being supported by spring means, the spring means of each bearing support may comprise its own pressure vessel.

Alternatively, the spring means associated to two bearings belonging to the same roller may share a common pressure vessel. In this connection, a preferred embodiment of the invention is devised such that two bearings are provided for each roller and that each of the two bearings has a support, wherein a fluid chamber is assigned to each of the two supports, wherein the two chambers are fluidly connected to the common pressure vessel by means of a fluid line each. Preferably, no fluid chambers of other supports than the supports of said two bearings are fluidly connected to said common pressure vessel.

In a further alternative, the spring means associated to all bearings of the pair of rollers supporting a riding ring may share a common pressure vessel.

In a preferred embodiment of the invention the fluid chamber comprises an elastically deformable shell, and is preferably designed as an air-suspension bellow or a flexible cushion. Such a fluid chamber that is preferably arranged below the roller bearing support does not only allow a vertical compensational movement of the roller, but may also a allow a horizontal flexibility so as to absorb thermal expansion of the support.

The invention may work with pressurized fluid systems. According to a first embodiment, the spring means are designed as a pneumatic spring. Thus, the spring force acting on the support is directly exerted by the pressurized gas. In particular, the fluid chamber and the pressure vessel are filled with compressed gas, in particular compressed air.

According to a second embodiment, the fluid chamber, the fluid line and a lower part of the pressure vessel are filled with a liquid, in particular water or hydraulic oil, the remaining, upper vessel volume being filled with compressed gas, in particular compressed air or compressed nitrogen. Thus, the compressed gas is only indirectly exerting the spring force on the roller bearings support, namely via the pressurized liquid, in particular water or hydraulic oil, that is arranged between the compressed gas being present in the pressure vessel and the support. The advantage of this embodiment is the possibility of introducing a leak-stop valve, which can block water exit in case of a leakage of the spring means.

According to a third embodiment, the fluid chamber is realized in a cylinder of a hydraulic cylinder-piston unit, wherein the cylinder or the piston is mechanically coupled to the support, and that the fluid chamber of the cylinder is fluidly connected to the pressure vessel, a so-called accumulator. Preferably, the fluid chamber, the fluid line and a lower part of the accumulator are filled with a liquid, in particular hydraulic oil, the remaining, upper vessel volume being filled with compressed gas, in particular compressed nitrogen. Common types of accumulators may be used, such as a bladder accumulator and a piston accumulator.

In said third embodiment the hydraulic cylinder-piston unit may preferably be coupled to the support by means of a rolling contact, wherein at least one contacting surface at the contact between the hydraulic cylinder-piston unit and the support has a curved configuration. Further, a rolling contact may also be provided between the hydraulic cylinder-piston unit and its foundation, wherein at least one contacting surface at the contact between the hydraulic cylinder-piston unit and its foundation has a curved configuration. In this way, it is possible to absorb any angular movement of the movable bearing support and to adjust to the given geometry of the foundation so as to have uniform contact. The rolling contact preferably takes place via curved swivel plates, which are mounted to the side of the hydraulic cylinder-piston unit contacting the foundation and/or to the side of the hydraulic cylinder-piston unit contacting the bearing support. The swivel plate preferably has a monoaxially, in particular cylindrically, curved contacting surface. Preferably, two swivel plates are arranged on top of each other, wherein the axis of curvature of the monoaxially curved surface of the first swivel plate and the axis of curvature of the monoaxially curved surface of the second swivel plate are arranged at an angle of 90°. The swivel plates are thus preferably based on the principle of a rocking chair with convex curved surfaces and are able to absorb angular deviations in all directions.

The advantage of the above mentioned embodiment is that the cylinder-piston unit is rolling on the surface of the counterpart, i.e. on the bearing support of the rollers and/or on the foundation, instead of sliding for example in a spherical bearing.

In all three embodiments of the spring means, the required spring characteristics, namely the softness of the spring means comes from the compressed gas that is arranged in the pressure vessel.

In order to enable an adjustment of the pressure of the fluid medium in the spring means, a compressor is preferably connected to the pressure vessel for compressing gas contained in the pressure vessel. In case of a liquid fluid, such as a hydraulic oil, being contained in the system, the pressure of the fluid medium can also be adjusted by adding or removing a certain amount of the liquid fluid in the system. In particular, the filing of the oil level may be adjusted by means of a hydraulic unit.

Further, the behaviour of the spring means may be adjusted by increasing or reducing the volume of the pressure vessel. Therefore, according to a preferred embodiment, the pressure vessel is fluidly connected to at least one additional pressure vessel by means of a fluid line that is equipped with a shut-off valve. In this way, it is possible to selectively connect or disconnect the volume of the additional pressure vessel to or from the volume of the pressure vessel so as to increase or reduce the total volume that can be filled with compressed gas. For example, enlarging the total volume that can be filled with compressed gas while maintaining the gas pressure allowing for an increased travel path of the rollers without changing the stiffness of the spring means.

In case of a rotary drum that is equipped with three or more riding rings, the inventive roller support is preferably only required for the middle ring(s). In this connection, a preferred embodiment of the invention is devised such that the rotary drum comprises at least three riding rings and only at least one middle ring arranged between two outer rings is supported by a pair of relatively spaced rollers that are equipped with said spring means comprising a pressure vessel charged with a compressed gas, wherein the pressure in the pressure vessel is adjusted so that the resulting force counteracting the weight of the rotary drum resting on the rollers corresponds to the nominal design load taken up by the rollers supporting the middle ring. In case of a rotary drum that is equipped with three riding rings, only the middle ring arranged between the two outer rings is supported by a pair of relatively spaced rollers that are equipped with the inventive spring means. In case of a rotary drum that is equipped with four riding rings, only the two middle rings arranged between the two outer rings are supported by a pair of relatively spaced rollers that are equipped with the inventive spring means.

Supporting only the middle ring(s) by means of the spring means ensure for less eccentricity of the rotary drum. Further, the installation and operating investment and efforts are greatly reduced without negatively affecting the compensating movement of the rollers. Further, it has been observed that especially the middle region of a rotary kiln is usually exposed to high weight loads, because the material deposits on the inner wall of the kiln mostly accumulate in the middle of the rotary kiln, which leads to the highest eccentric loads.

The invention provides for the effect that the rollers assigned to the middle ring(s) are substantially constantly contacted by the riding ring. In a preferred embodiment, this enables the rollers assigned to the middle ring(s) of the drum to function as the rotary drive for imparting rotational movement to the rotary drum. Thus, said middle rollers may be coupled to a drive arrangement, such as a motor, for rotating the rollers, wherein the rotation of the rollers is transferred to the riding ring by the friction occurring between the surface of the rollers and the riding ring.

In order to minimize the bending stresses and to avoid fatigue cracks in the drum shell, it is important to keep the drum aligned. The drum is aligned when the centres of the three or more riding rings are arranged in one straight line. Keeping the centres of all riding rings in one straight line is more easily achieved in an arrangement, where only the middle riding ring(s) of the drum is/are supported by the inventive spring means and the outer riding rings are supported on rigidly supported rollers. According to a preferred embodiment of the invention, a alignment of the centres of the riding rings is achieved by adjusting the height of the rollers that support the middle ring(s) so as to align the centre of the middle ring(s) with the centre of the outer rings. The height adjustment is preferably realized by adjusting the fluid pressure prevailing in the fluid chamber.

In a situation where a crank is present in the drum, the centre of the riding ring(s) that is/are supported by the inventive spring means rotates eccentric on an orbit. In this case, the centre of said orbit is aligned with the centres of the other riding rings.

In order to determine, whether the centre of the riding ring or its orbit is misaligned, the arrangement preferably comprises at least one sensor for measuring the vertical position of the riding ring relative to a stationary reference point, such as a foundation. Instead of measuring the vertical position of the riding ring, the sensor can also be arranged to measure the vertical position of the drum adjacent the support rollers relative to a stationary reference point, such as a foundation.

The sensor can be mounted to the foundation or any other stationary structure around the drum and may be configured as a distance sensor to measure its distance to the outer surface of the riding ring or to the drum near the supports for the rollers. Preferably, the distance sensor is configured as an ultrasound distance sensor. Preferably, the sensor is arranged below the riding ring between the rollers of the pair of rollers supporting said riding ring. Preferably the sensor is configured to continuously measure the vertical position. Alternatively also the height position of the rollers, or any other part that follows the eccentric movement of the drum, can be measured by a suitable sensor.

Due to the eccentric movement of the drum and the riding ring, the height sensors measure a constant change in height. Therefore, in order to obtain the height position of the centre of the orbit, the measured values are preferably sampled and the average is calculated over each full turn of the rotary drum. Said average value is representing the center of the orbit.

A control system is preferably provided for maintaining the center height of the orbit at a fixed set point, where the rotary kiln axis is straight.

An adjustment of the height may also be required in order to compensate for weight variations of the rotary drum. When the weight changes, the drum applies more load to the rollers, whereupon the rotary drum deflects and the center of the roller orbit goes down. The deviation on height is detected by the control system, which is counteracting by increasing the pressure to bring the center height back to the set point.

To increase the height, the pressure in the system is preferably increased. To decrease the height, the pressure in the system is preferably decreased. The pressure adjustments are preferably done by adding or releasing gas or hydraulic oil, depending on the system.

BRIEF DESCRIPTION OF THE DRAWINGS

The invention will now be described in more detail with reference to exemplary embodiments illustrated in the drawings.

DETAILED DESCRIPTION

Figure 1:
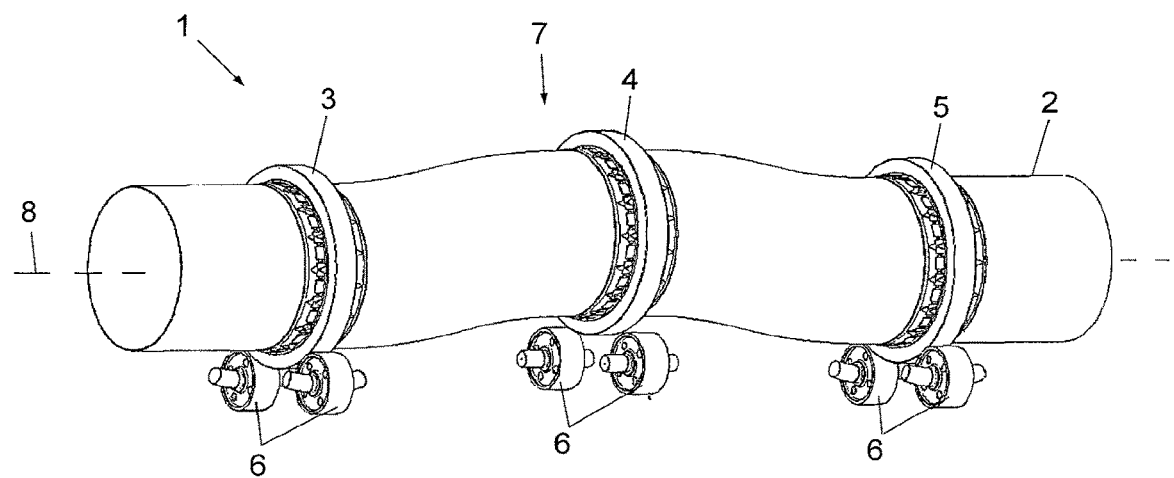
FIG. 1 shows a rotary kiln with a straightness deviation of the kiln tube in a first angular position.
Figure 2:
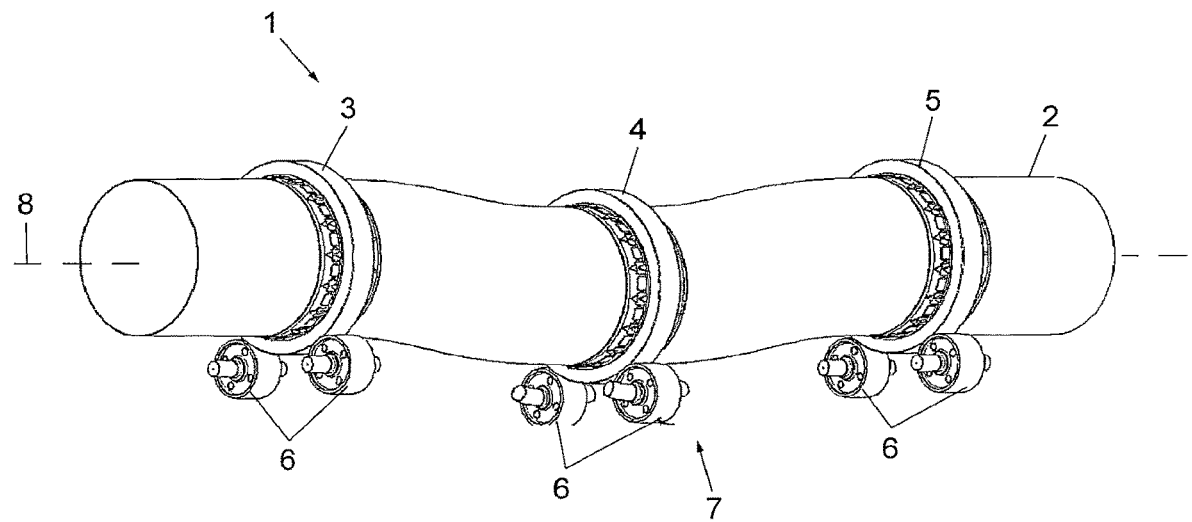
FIG. 2 shows the rotary kiln of FIG. 1 in a second angular position.

In FIG. 1 the shell of a rotary kiln 1 is denoted by 2. The rotary kiln 1 has three riding rings 3, 4 and 5 distributedly arranged along the axial direction of the rotary kiln 1. Each ring 3,4,5 is supported by a pair of rollers 6. The shell 2 of the rotary kiln has a crank 7, which has the shape of a straightness deviation in the middle region of the kiln 1. As shown in FIG. 1 the crank 7, during the rotation of the kiln 1 about its axis 8, gets in an upper position, in which the middle riding ring 4 of the kiln 1 can in extreme cases lift from the associated support rollers 6. This results in that the rollers 6 supporting the middle ring 4 are taking up a considerably lower load than the corresponding nominal design load or even no load at all, while the rollers 6 associated to the outer rings 3 and 5 have to take up an accordingly higher load. In FIG. 2 the crank 7, half a revolution later, is shown in a lower position, in which the middle ring 4 exerts an very high overload on the associated rollers, while the rollers 6 associated to the outer rings 3 and 5 take up a lower load than the nominal load. Thus, a crank as shown leads to a cyclic overload of all supporting rollers once per revolution. As a consequence, the lifetime of the riding rings and the support rollers gets drastically reduced.

Figure 3:
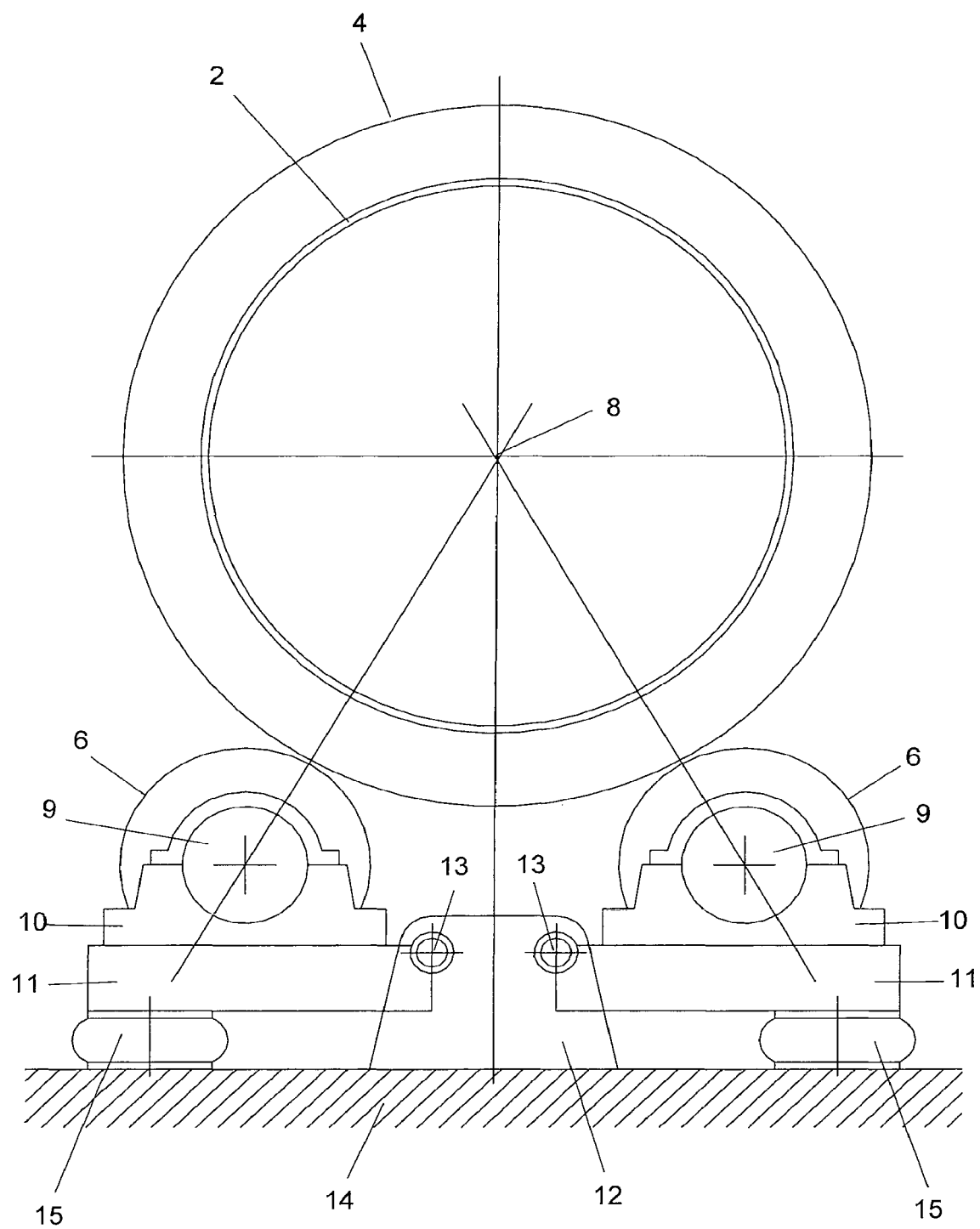
FIG. 3 is a schematic axial view of the rotary kiln with support rollers.

As shown in FIG. 3, the rollers 6 have roller shafts 9 that are rotatably held in bearings 10. Each bearing 10 is mounted to a support 11. The supports 11 in their end regions facing to each other are pivotably mounted to a fixed mount 12 so as to be pivotable about the pivot axis 13, which enables movement of the rollers 6 toward and away from the shell 2 of the rotary kiln 1. Such movement allows the rollers 6 to compensate for or follow the eccentric movements of the riding ring 4 due to straightness deviations of the shell 2. In the opposite end region the supports 11 are supported on a foundation 14 via spring means generally denoted by 15. The spring means are exerting a spring force acting on the associated support 11 so as to counteract the weight of the rotary kiln 1 resting on the rollers 6. The spring force is adjusted such that the rollers 6 are in their neutral position when the nominal load is acting on the rollers 6. The spring means 15 are preferably configured with a spring characteristics such that the spring force acting on the support 11 remains substantially constant also during the compensation movements of the rollers 6 mentioned above.

Figure 4:
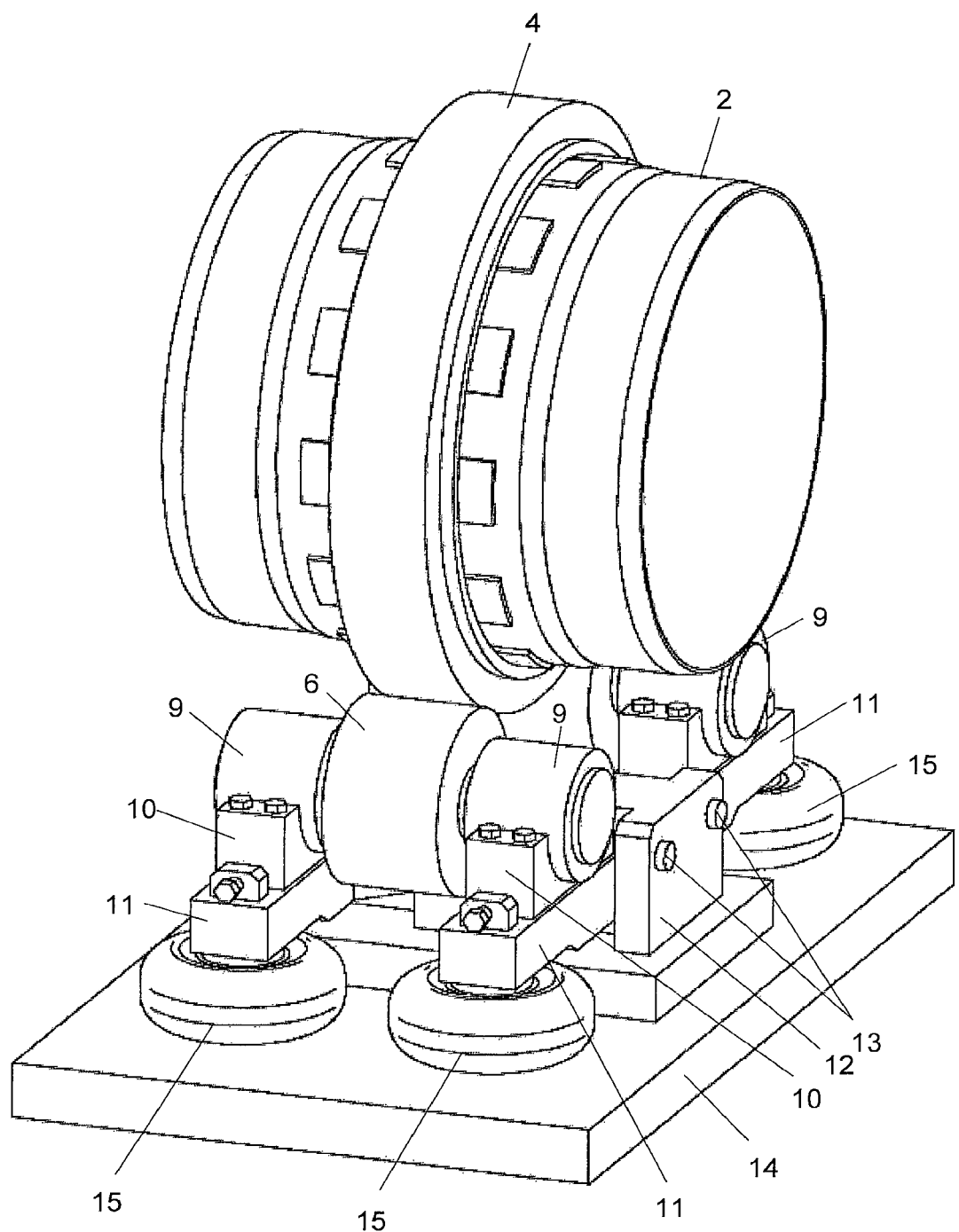
FIG. 4 is a perspective view of the rotary kiln of FIG. 3.

FIG. 4 shows that each roller 6 has two bearings 6 and two associated supports 11. Further, each support 11 is supported by its own spring means 15.

In order to achieve the required spring characteristics, the spring means comprise a pressure vessel charged with a compressed gas that exerts the spring force. In a first embodiment shown in FIG. 5 the spring means 15 are designed as a pneumatic spring and comprise a fluid chamber 16 designed so as to change its volume upon movement of the roller 6 under the weight 17 of the rotary kiln 1 resting on the rollers 6. The chamber may be realized as an air-suspension bellow 16. The bellow 16 is fluidly connected to the pressure vessel 18 by means of the fluid line 19. The entire system consisting of the bellow 16, the fluid line 19 and the pressure vessel or air tank 18 is filled with compressed air, wherein a compressor (not shown) is used to pressurize the system.

Figure 6:
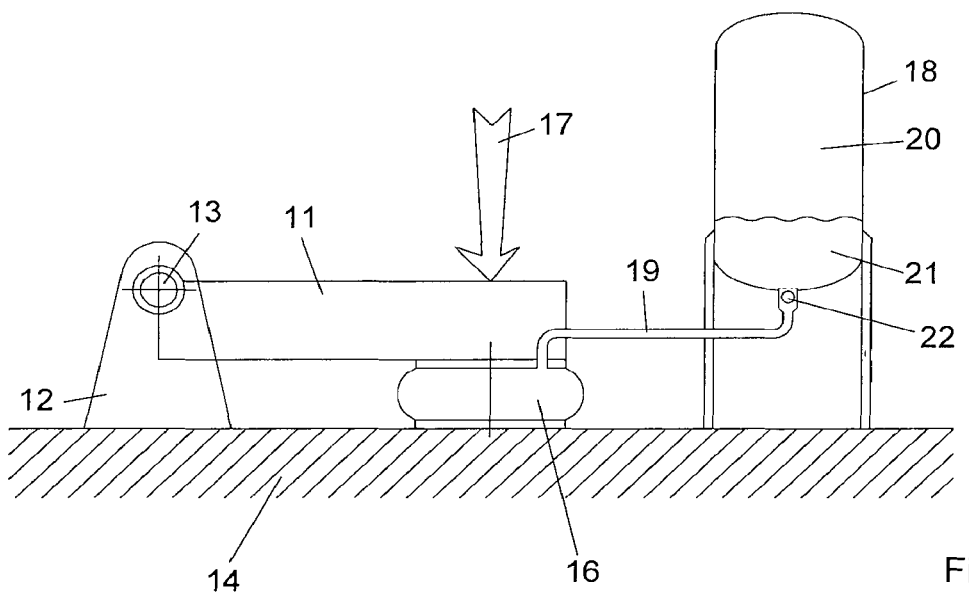
FIG. 6 is a schematic illustration of a second embodiment of spring means for supporting the rollers.

In the second embodiment shown in FIG. 6 the flexible chamber 16, the connection line 19 and the lower part of the pressure vessel 18 are filled with water 21, whereas the softness of the spring system is achieved by the compressed air 20 that is present in the upper part of the vessel 18. The advantage of this combined air-water system is the possibility of introducing a leak-stop valve 22, which can block water exit in case of a leakage in the spring system.

Figure 7:
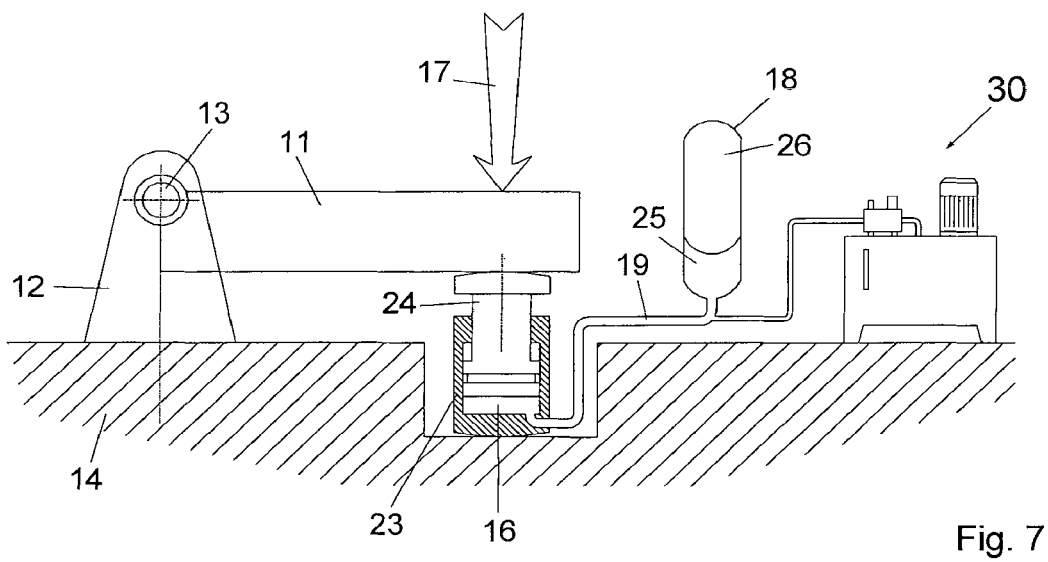
FIG. 7 is a schematic illustration of a third embodiment of spring means for supporting the rollers.

In the third embodiment shown in FIG. 7 the fluid chamber 16 is realized in a cylinder 23 of a hydraulic cylinder-piston unit, wherein the piston 24 is mechanically coupled to the support 11. The fluid chamber 16 of the cylinder 23 is fluidly connected to the accumulator 18 via the fluid line 19. The fluid chamber 16, the fluid line 19 and a lower part of the accumulator 18 are filled with hydraulic oil 25, the remaining, upper vessel volume being filled with compressed gas, in particular compressed nitrogen 26. Thus, a hydraulic cylinder is used instead of a pneumatic spring, wherein the required spring characteristics is achieved by the vessel 18 functioning as nitrogen accumulator. In order to adjust the fluid pressure in the fluid system, a pump unit 30 is preferably provided that is connected to the fluid line 19. The pump unit 30 serves to pump an additional amount of hydraulic oil into the fluid system.

Figure 5:
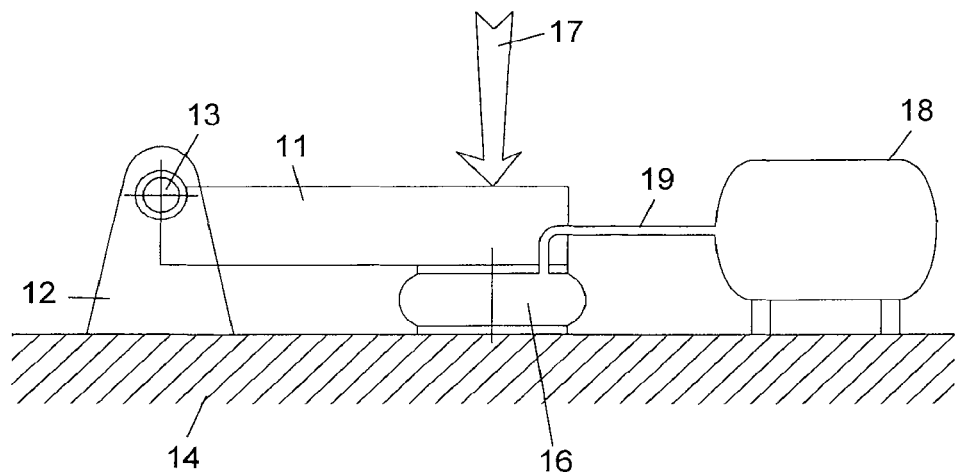
FIG. 5 is a schematic illustration of a first embodiment of spring means for supporting the rollers.

The advantage of the air spring systems according to FIGS. 5 and 6 when compared to a hydraulic cylinder according to FIG. 7 is that air springs are simpler in construction and cheaper and that no sealings are required that are subject to wear. Further, air springs require considerably less vertical space.

Figure 8:
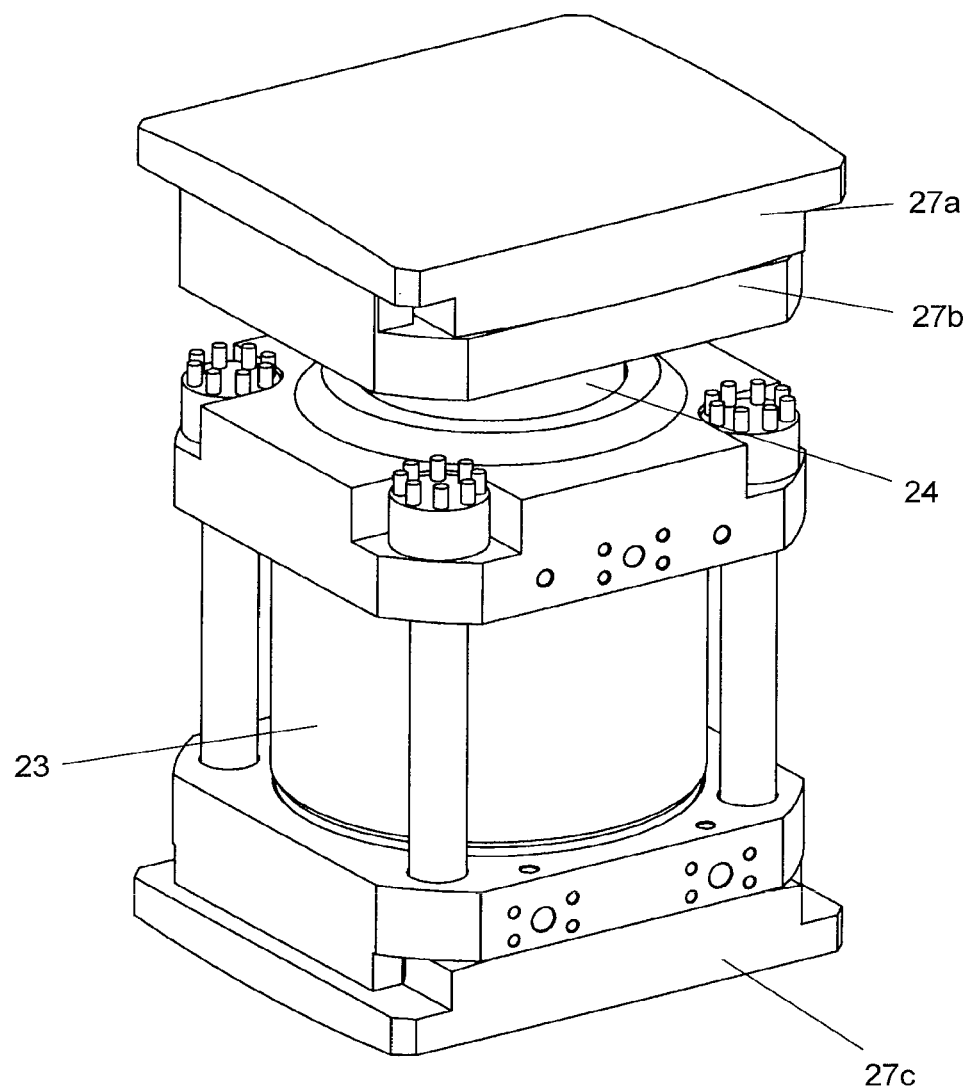
FIG. 8 is a detailed view of the piston of the third embodiment of the spring means for supporting the rollers as shown in FIG. 7 and FIG. 9 corresponds to the schematic axial view of the rotary kiln with support rollers depicted in FIG. 3, but equipped with height sensors and the piston of FIG. 8.

FIG. 8 shows a detailed view of the hydraulic cylinder-piston unit of the third embodiment of the spring means for supporting the rollers as shown in FIG. 7, whereby in said embodiment the hydraulic cylinder-piston unit is contacting the support 11 by means of swivel plates 27a and 27b. Further, the hydraulic cylinder-piston unit is contacting the foundation 14 by means of a swivel plate 27c. The swivel plates 27a, 27b and 27c each comprise a curved surface, so as to absorb any angular movement of the support 11 and to adjust to the given geometry of the foundation. The swivel plates 27a and 27b are arranged on top of each other and each have a monoaxially curved surface, wherein the axis of curvature of the swivel plate 27a is at an angle of 90° relative to the axis of curvature of the swivel plate 27b.

Figure 9:
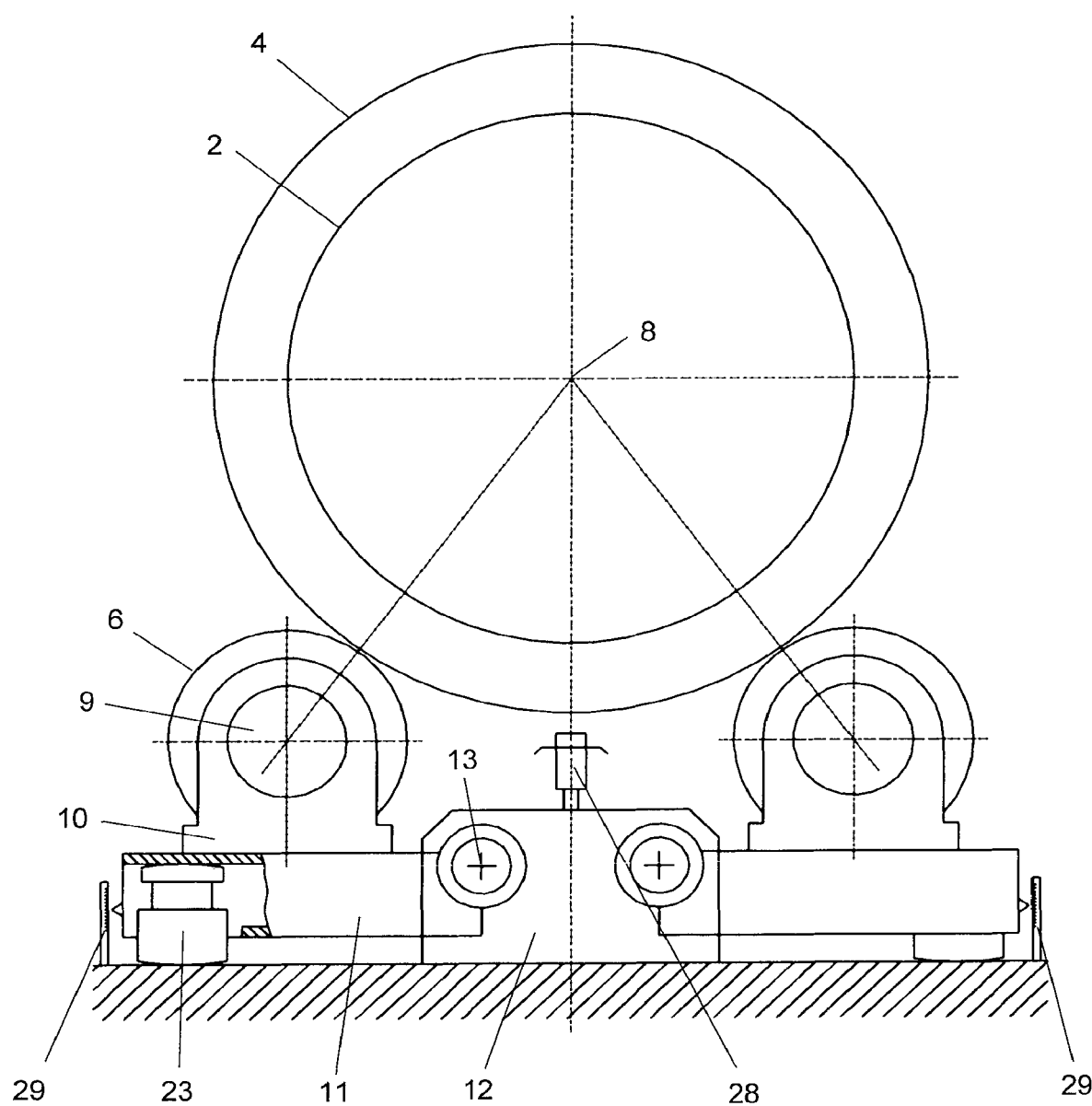

FIG. 9 shows a schematic axial view of the rotary kiln 2 with support rollers 6 as in FIG. 3, but equipped with height sensors 28 and 29 and with the hydraulic cylinder-piston unit as described with regard to FIG. 8. Sensor 28 is mounted to the fixed mount 12 and continuously measures its distance to the outer surface of the riding ring 4. Furthermore two height sensors 29 are mounted near the supports 11 for the rollers 6 on each side of the arrangement, whereby the sensors 29 continuously measure the height of the support 11 of the rollers 6. The sensor 28 and the sensors 29 can be used as an alternative.

The invention claimed is:

1. An arrangement for supporting a rotary drum, said rotary drum having at least three riding rings distributedly arranged along the axial direction of the rotary drum, the arrangement comprising a pair of relatively spaced rollers for supporting a riding ring, at least one bearing for each roller, a support for each bearing mounted for movement of the roller toward and away from the shell of the rotary drum and spring means exerting a spring force acting on the support so as to counteract the weight of the rotary drum resting on the rollers, wherein the spring means comprises a pressure vessel charged with a compressed gas that exerts the spring force and wherein the rotary drum comprises at least three riding rings and only at least one middle ring arranged between two outer rings is supported by a pair of relatively spaced rollers that are equipped with said spring means comprising the pressure vessel charged with the compressed gas, wherein the spring means comprise a fluid chamber configured to change its volume upon movement of the roller under the weight of the rotary drum resting on the rollers, wherein said chamber is fluidly connected to the pressure vessel by means of a fluid line, wherein the fluid chamber is realized in a cylinder of a hydraulic cylinder-piston unit, wherein the cylinder or the piston is mechanically coupled to the support, and the support is supported on a foundation and wherein the fluid chamber of the cylinder is fluidly connected to the pressure vessel and whereby the hydraulic cylinder-piston unit contacts the support by means of a first swivel plate and a second swivel plate, and contacts the foundation by means of a third swivel plate, wherein the swivel plates each comprises a curved surface.

2. The arrangement according to claim 1, wherein the support is mounted for pivotal movement about a pivot axis and the spring means are arranged to act on the support at a distance from the pivot axis of the support that is larger than the distance of the roller from the pivot axis.

3. The arrangement according to claim 1, wherein two bearings are provided for each roller and wherein each of the two bearings has a support, wherein a fluid chamber is assigned to each of the two supports, wherein the two chambers are fluidly connected to the pressure vessel by means of a fluid line each.

4. The arrangement according to claim 1, wherein the fluid chamber comprises an elastically deformable shell, and is preferably designed as an air-suspension bellow.

5. The arrangement according to claim 1, wherein the spring means are designed as a pneumatic spring.

6. The arrangement according to claim 1, wherein the fluid chamber and the pressure vessel are filled with compressed gas.

7. The arrangement according to claim 1, wherein the fluid chamber, the fluid line and a lower part of the pressure vessel are filled with a liquid, the remaining, upper vessel volume being filled with compressed gas.

8. The arrangement according to claim 1, wherein the fluid chamber, the fluid line and a lower part of the pressure vessel are filled with hydraulic oil, the remaining, upper vessel volume being filled with compressed gas.

9. The arrangement according to claim 1, wherein a compressor is connected to the pressure vessel for compressing gas contained in the vessel.

10. The arrangement according to claim 1, further comprising at least one sensor for measuring the vertical position of the riding ring relative to a stationary reference point and/or for measuring the vertical position of the rotary drum adjacent the rollers relative to a stationary reference point.

11. The arrangement according to claim 1, wherein the rotary drum is a rotary kiln of a cement manufacturing installation.

12. The arrangement according to claim 5, wherein the fluid chamber is designed as an air-suspension bellow.

13. The arrangement according to claim 7, wherein the fluid chamber and the pressure vessel are filled with compressed air.

14. The arrangement according to claim 8, wherein the fluid chamber, the fluid line and the lower part of the pressure vessel are filled with a water, and the remaining, upper vessel volume is filled with compressed air.

15. The arrangement according to claim 10, wherein the remaining, upper vessel volume is filled with compressed nitrogen.

* * * * *